United States Patent
Satou et al.

(10) Patent No.: US 7,052,759 B2
(45) Date of Patent: May 30, 2006

(54) OPTICAL RECORDING MEDIUM

(75) Inventors: Junichi Satou, Tokyo (JP); Mamoru Usami, Tokyo (JP); Yoshimi Sakai, Tokyo (JP)

(73) Assignee: TDK Corporation (JP)

( * ) Notice: Subject to any disclaimer, the term of this patent is extended or adjusted under 35 U.S.C. 154(b) by 129 days.

(21) Appl. No.: 10/860,789

(22) Filed: Jun. 2, 2004

(65) Prior Publication Data

US 2005/0271854 A1    Dec. 8, 2005

(51) Int. Cl.
*B32B 3/02* (2006.01)

(52) U.S. Cl. ............... 428/64.1; 428/64.4; 430/270.11

(58) Field of Classification Search ............... 428/64.4; 430/270.11
See application file for complete search history.

(56) References Cited

U.S. PATENT DOCUMENTS

| | | | | |
|---|---|---|---|---|
| 5,820,961 A | * | 10/1998 | Maruyama et al. ........ 428/64.1 |
| 5,972,457 A | * | 10/1999 | Matsuishi et al. ......... 428/64.1 |
| 2001/0022769 A1 | * | 9/2001 | Waki et al. ................. 369/172 |
| 2004/0072032 A1 | * | 4/2004 | Ohishi ................. 428/694 ML |
| 2005/0238837 A1 | * | 10/2005 | Satou et al. ............... 428/64.4 |

FOREIGN PATENT DOCUMENTS

JP    2002-237103    8/2002

* cited by examiner

*Primary Examiner*—Elizabeth Mulvaney
(74) *Attorney, Agent, or Firm*—Young Law Firm, P.C.

(57) ABSTRACT

An optical recording medium of the present invention includes a disk body and an ink-receiving layer disposed on a label surface of the disk body, wherein the ink-receiving layer has a brightness of 8 or more, a chroma of 4 or less, and an average surface roughness (Ra) of 0.1 µm or less. Therefore, a colored layer of white ink need not be provided below the ink-receiving layer to simplify the manufacturing process. Furthermore, even when the ink-receiving layer is formed by a spin coating or slit coating process in which the surface quality of an underlying layer is greatly reflected, therefore, the average surface roughness (Ra) of the ink-receiving layer can be significantly decreased. Thus, printing by an ink jet printer can produce a color and brilliance close to those of a silver salt photograph.

17 Claims, 4 Drawing Sheets

OPTICAL RECORDING MEDIUM

TECHNICAL FIELD

The present invention relates to an optical recording medium, and particularly to an optical recording medium permitting printing on a label surface opposite to a light incidence surface.

BACKGROUND ART

In recent years, optical recording media such as CDs (Compact Disc) and DVDs (Digital Versatile Disc) have been widely used as recording media for recording large volumes of digital data. In particular, optical recording media capable of data recording by users have been rapidly popularized. The use of recordable optical recording media enables the simple and inexpensive storage of digital data of large file size, such as picture data and music data. Therefore, the recordable recording media are used by many users. The popularization of such types of optical recording media has increased the demand for manufacture of an original optical recording medium in which a print is provided on a surface (referred to as a "label surface" hereinafter) opposite to a light incidence surface by a printer. Optical recording media capable of realizing the manufacture of original recording media have already been developed and sold.

Such optical recording media include ink-receiving layers provided on the label surfaces, for fixing ink. The ink-receiving layers can be supplied with ink by an ink-jet printer to provide a print on the label surfaces.

However, printability of optical recording media is generally lower than that of glossy paper. There is thus the problem of failing to sufficiently utilize the performance of an ink jet printer capable of high-quality printing. In order to solve this problem, Japanese Unexamined Patent Application Publication No. 2002-237103 proposes an optical recording medium comprising an ink-receiving layer having surface roughness decreased to a predetermined value or less.

In order to decrease the surface roughness of the ink-receiving layer, it is thought to be desirable for the ink-receiving layer to be formed by a spin coating method. In this case, the surface roughness of the ink-receiving layer is influenced by an underlying layer. Even if a coating solution capable of achieving a smooth surface is selected, the surface roughness of the formed ink-receiving layer is not necessarily decreased. There is thus the problem of failing to achieve high printability.

When the ink-receiving layer is formed by the spin coating method as described above, it is not necessarily easy to decrease the surface roughness.

SUMMARY OF THE INVENTION

Accordingly, an object of the present invention is to provide an optical recording medium in which the surface roughness of an ink-receiving layer is securely decreased to permit high-quality printing on the ink-receiving layer.

An optical recording medium of the present invention comprises a disk body and an ink-receiving layer disposed on the label surface of the disk body, wherein the ink-receiving layer has a brightness of 8 or more, a chroma of 4 or less, and an average surface roughness (Ra) of 0.1 μm or less.

According to the present invention, the ink-receiving layer has a brightness of 8 or more and a chroma of 4 or less, and has a white color or a bright color close to white, thereby making it unnecessary to provide a colored layer of white ink below the ink-receiving layer. Therefore, the manufacturing process can be simplified, and even if the ink-receiving layer is formed by the spin coating method or slit coating method in which the surface quality of the underlying layer is greatly reflected, the average surface roughness (Ra) of the ink-receiving layer can be significantly decreased. Therefore, printing by an ink jet printer can produce a color and brilliance close to those of a silver salt photograph.

Examples of colors having a brightness of 8 or more and a chroma or 4 or less include white (hue: N, brightness: 9.5, chroma: 0 (designated by the Munsell system, this designation applying to the description below) ), snow white (hue. N, brightness: 9.5, chroma: 0), baby pink (hue: 4R, brightness: 8.5, chroma: 4.0), shell pink (hue: 10R, brightness: 8.5, chroma: 3.5), nail pink (hue: 10R, brightness: 8.0, chroma: 4.0), peach (hue: 3YR, brightness: 8.0, chroma: 3.5), ecru beige (hue: 7.5YR, brightness: 8.5, chroma: 4.0), leghorn (hue: 2.5Y, brightness: 8.0, chroma: 4.0), cream yellow (hue: 5Y, brightness: 8.5, chroma: 3.5), ivory (hue: 2.5Y, brightness: 8.5, chroma: 1.5), cool white (hue: 10PB, brightness: 9.5, chroma: 0.5), and cherry blossom (hue: 10RP, brightness: 9.0, chroma: 2.5).

In the present invention, the ink-receiving layer preferably has a brightness of 9 or more and a chroma of 3 or less. The ink-receiving layer having a brightness of 9 or more and a chroma of 3 or less can achieve high printability. Examples of colors having a brightness of 9 or more and a chroma of 3 or less include white (hue: N, brightness: 9.5, chroma: 0), snow white (hue: N, brightness: 9.5, chroma: 0), cool white (hue: 10PB, brightness: 9.5, chroma: 0.5), and cherry blossom (hue: 10RP, brightness: 9.0, chroma: 2.5).

In the present invention, the ink-receiving layer more preferably has a brightness of 9.2 or more and a chroma of 0.5 or less. The ink-receiving layer having a brightness of 9.2 or more and a chroma of 0.5 or less can achieve higher printability. Examples of colors having a brightness of 9.2 of more and a chroma of 0.5 or less include white (hue: N, brightness: 9.5, chroma; 0), snow white (hue: N, brightness: 9.5, chroma: 0), and cool white (hue: 10PB, brightness: 9.5, chroma: 0.5).

The disk body preferably comprises a light-transmissive substrate, a protective layer, and a functional layer disposed between the light-transmissive substrate and the protective layer, the light-transmissive substrate having a thickness larger than that of the protective layer. The optical recording medium having the above-described structure is a so-called CD-type optical recording medium. In this case, the protective layer preferably has an average surface roughness (Ra) of 0.1 μm or less, and the ink-receiving layer is more preferably formed directly on the surface of the protective layer.

Also, the disk body preferably comprises a light-transmissive substrate, a support substrate, and a functional layer disposed between the light-transmissive substrate and the support substrate, the light-transmissive substrate having substantially the same thickness as that of the support substrate. The optical recording medium having the above-described structure is a so-called DVD-type optical recording medium. The support substrate used in the DVD-type optical recording medium may be referred to as a "dummy substrate". In this case, the support substrate preferably has an average surface roughness (Ra) of 0.1 μm or less, and the ink-receiving layer is more preferably formed directly on the surface of the support substrate.

Also, the disk body preferably comprises a light-transmissive layer, a support substrate, and a functional layer disposed between the light-transmissive layer and the support substrate, the light-transmissive layer having a thickness smaller than that of the support substrate. The optical recording medium having the above-described structure is a so-called next-generation recording medium. In this case, the support substrate preferably has an average surface roughness (Ra) of 0.1 μm or less, and the ink-receiving layer is more preferably formed directly on the surface of the support substrate.

The functional layer preferably includes a recording layer. The optical recording medium enables the user to record data, and thus effectively exhibits the characteristic of the optical recording medium of the present invention that a high-quality print can be provided on the label surface. In this case, like in a recordable optical recording medium, the recording layer may contain an organic dye or an inorganic material. Like in a rewritable optical recording medium, the recording layer may contain a phase change material.

In the present invention, the ink-receiving layer has a brightness of 8 or more and a chroma of 4 or less, and thus a colored layer of white ink need not be provided below the ink-receiving layer, thereby simplifying the manufacturing process. Furthermore, the ink-receiving layer has an average surface roughness (Ra) of 0.1 μm or less. In printing by an ink jet printer, therefore, a color and brilliance close to those of a silver salt photograph can be obtained.

BEST MODE FOR CARRYING OUT THE INVENTION

Preferred embodiments of the present invention will be described in detail below with reference to the attached drawings.

Figure 1:
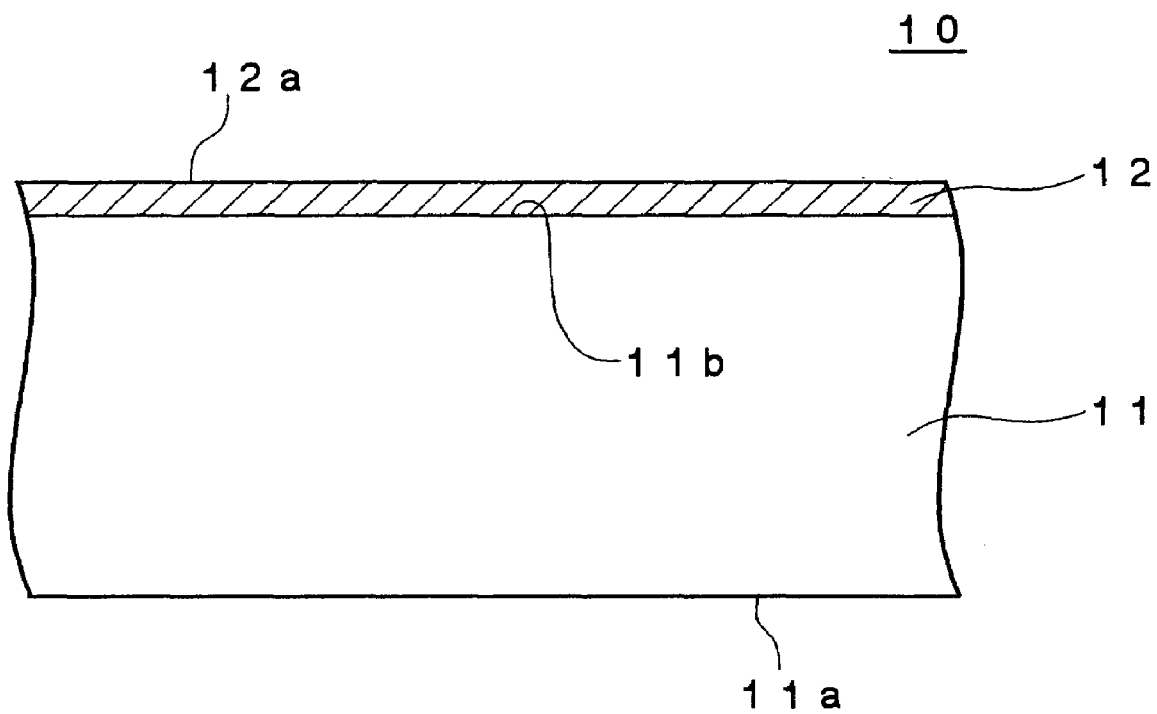
FIG. 1 is a sectional view schematically showing the structure of an optical recording medium according to a preferred embodiment of the present invention.

FIG. 1 is a sectional view schematically showing the structure of an optical recording medium according to a preferred embodiment of the present invention.

As shown in FIG. 1, an optical recording medium 10 according to the embodiment comprises a disk body 11 and an ink-receiving layer 12 provided on a label surface 11b of the disk body 11.

The disk body 11 has a light incidence surface 11a to which a laser beam is applied during recording and/or reproduction, and the label surface 11b at the back thereof. The type of disk body 11 is not particularly limited, and any of CD-type disks such as a CD-ROM type, a CD-R type, and a CD-RW type; DVD-type disks such as a DVD-ROM type, a DVD-R type, and a DVD-RW type; and next-generation optical disks using a laser beam in the blue wavelength region can be used.

Figure 2A:
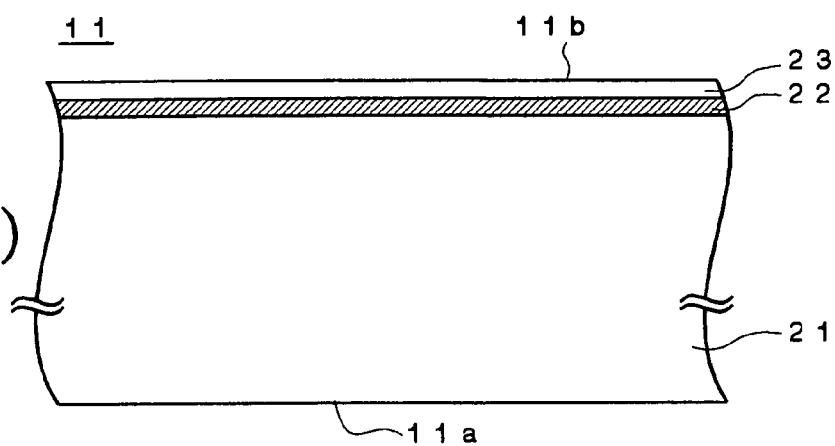
FIG. 2 is a drawing showing examples of a disk body to which the present invention is suitably applied, FIGS. 2(a), 2(b), and 2(c) showing cross sections of a CD-type disk, a DVD-type disk, and a next-generation disk, respectively.
Figure 2B:
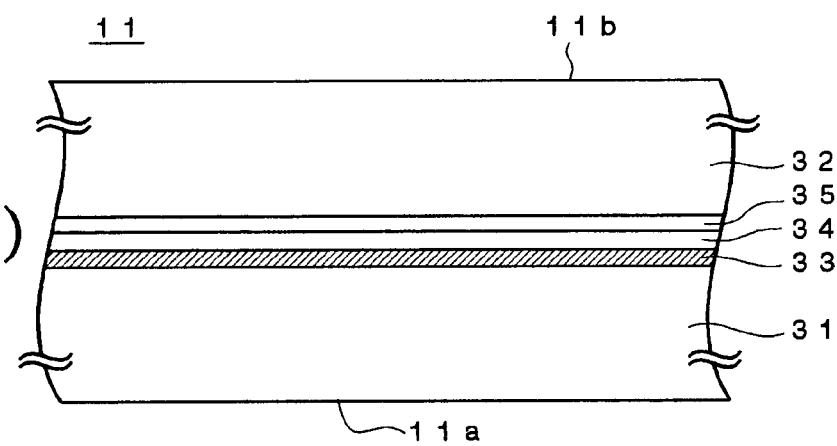
Figure 2C:
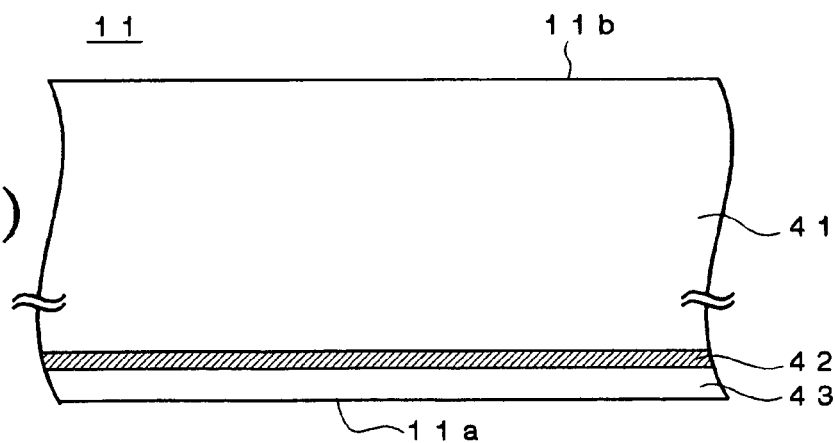

FIG. 2 is a drawing showing examples of the disk body 11 to which the present invention is suitably applied, FIGS. 2(a), 2(b), and 2(c) showing cross sections of a CD-type disk, a DVD-type disk, and a next-generation disk, respectively.

As shown in FIG. 2(a), the CD-type disk comprises a light-transmissive substrate 21 having a surface functioning as the light incidence surface 11a and having a thickness of about 1.2 mm, a functional layer 22 provided on the other surface of the light-transmissive substrate 21, and a protective layer 23 covering the functional layer 22 and having a thickness of about 10 μm. The surface of the protective layer 23 functions as the label surface 11b. Therefore, when the CD-type disk shown in FIG. 2(a) is used as the disk body 11, the ink-receiving layer 12 is provided on the surface (the label surface 11b) of the protective layer 23. Since the protective layer 23 is used as a base of the ink-receiving layer 12, the average roughness (Ra) of the surface (the label surface 11b) is preferably as small as possible, and more preferably 0.1 μm or less. The surface roughness of 0.1 μm or less can easily be achieved by the spin coating process for forming the protective layer 23.

As a material for the light-transmissive substrate 21, a resin is preferably used from the viewpoint of ease of formation. Examples of the resin used for the light-transmissive substrate 21 include a polycarbonate resin, an olefin resin, an acrylic resin, an epoxy resin, a polystyrene resin, a polyethylene resin, a polypropylene resin, a silicone resin, a fluorocarbon resin, an ABS resin, and a urethane resin. Among these resins, particularly, a polycarbonate resin or an olefin resin is preferably used because it has excellent optical properties and processability.

Figure 3:
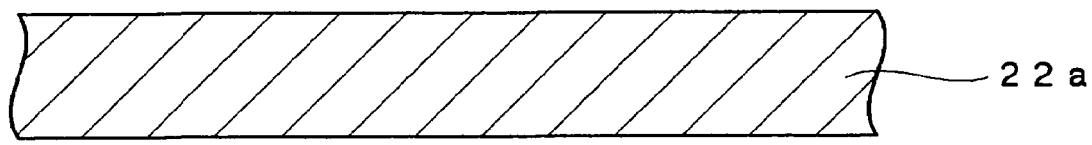
FIG. 3 is a schematic sectional view showing the structure of a functional layer in a ROM disk.
Figure 4:
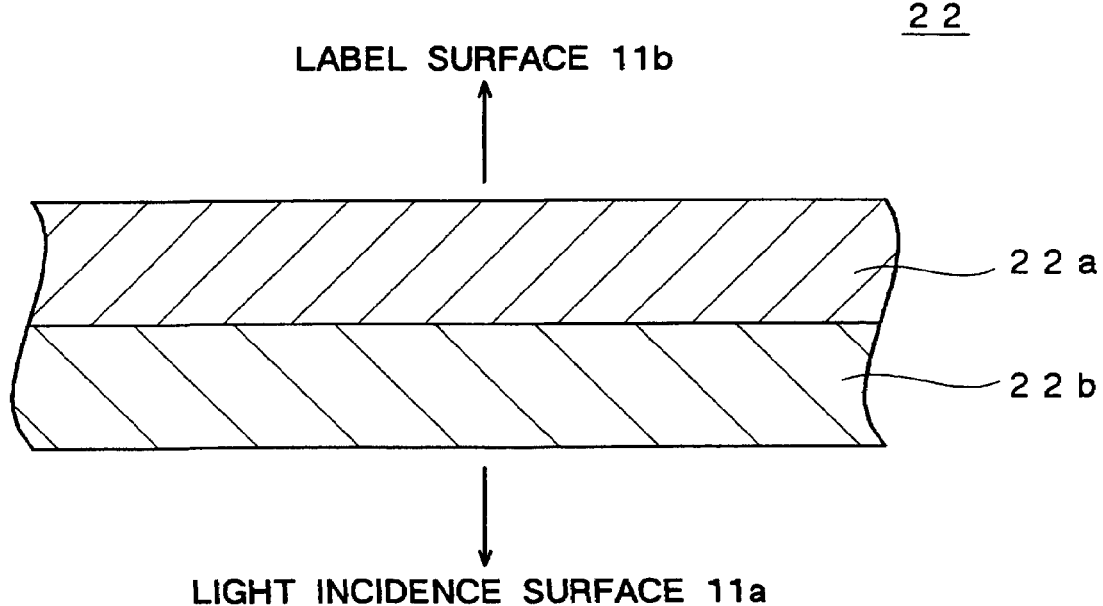
FIG. 4 is a schematic sectional view showing the structure of a functional layer in a recordable disk.
Figure 5:
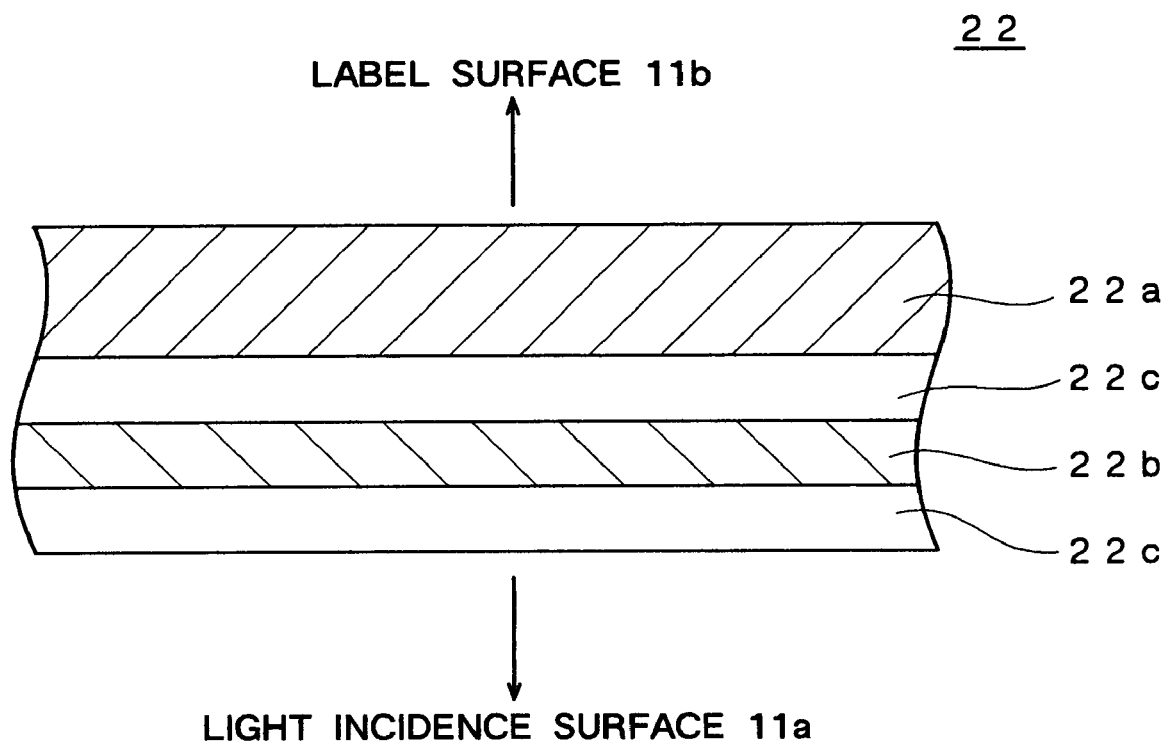
FIG. 5 is a schematic sectional view showing the structure of a functional layer in a rewritable disk.

The structure and material of the functional layer 22 depend upon the type of disk used. In a ROM disk such as a CD-ROM disk, the functional layer 22 generally comprises a reflective layer 22a containing a metal, as shown in FIG. 3. In a recordable disk such as a CD-R disk, the functional layer 22 generally comprises a recording layer 22b containing an organic dye, and a reflective layer 22a containing a metal and provided on the recording layer 22b, as shown in FIG. 4. In a rewritable disk such as a CD-RW disk, the functional layer 22 generally comprises a recording layer 22b containing a phase change material, a plurality of dielectric layers 22c holding the recording layer 22b therebetween, and a reflective layer 22a containing a metal, as shown in FIG. 5. However, the present invention is aimed at an optical recording medium permitting printing on a label surface, and thus the present invention is suitably applied to the recordable disk (FIG. 4) and the rewritable disk (FIG. 5).

As shown in FIG. 2(b), the DVD-type disk comprises a light-transmissive substrate 31 having a surface functioning as the light incidence surface 11a and having a thickness of about 0.6 mm, a support substrate (dummy substrate) 32 having a surface functioning as the label surface 11b and having a thickness of about 0.6 mm, a functional layer 33 provided on the other surface of the light-transmissive substrate 31, a protective layer 34 covering the functional layer 33, and an adhesive layer 35 for bonding a laminate including the light-transmissive substrate 31, the functional layer 33, and the protective layer 34 to the support substrate 32. Therefore, when the DVD-type disk shown in FIG. 2(b) is used as the disk body 11, the ink-receiving layer 12 is provided on the surface (the label surface 11b) of the support substrate 32. Since the support substrate 32 is used as a base of the ink-receiving layer 12, the average roughness (Ra) of the surface (the label surface 11b) is preferably as small as possible, and more preferably 0.1 μm or less. The surface roughness of 0.1 µm or less can easily be achieved by injection for forming the support substrate 32.

The structure and material of the functional layer 33 depend upon the type of disk used. Like in the CD-type disk, in a ROM disk such as a DVD-ROM disk, the functional layer 33 generally comprises a reflective layer containing a metal (refer to FIG. 3) In a recordable disk such as a DVD-R disk, the functional layer 33 generally comprises a recording layer containing an organic dye and a reflective layer containing a metal and provided on the recording layer (refer to FIG. 4). In a rewritable disk such as a DVD-RW disk, the functional layer 33 generally comprises a recording layer containing a phase change material, a plurality of dielectric layers holding the recording layer therebetween, and a reflective layer containing a metal (refer to FIG. 5). As materials for the light-transmissive substrate 31 and the support substrate 32, the same materials as the above-described preferred examples of the material for the light-transmissive substrate 21 can be used.

As shown in FIG. 2(c), the next-generation disk comprises a support substrate 41 having a surface functioning as the label surface 11b and having a thickness of about 1.1 mm, a functional layer 42 provided on the other surface of the support substrate 41, and a light-transmissive layer 43 covering the functional layer 42 and having a thickness of about 0.1 mm. The surface of the light-transmissive layer 43 functions as the light incidence surface 11a. Therefore, when the next-generation disk shown in FIG. 2(c) is used as the disk body 11, the ink-receiving layer 12 is provided on the surface (the label surface 11b) of the support substrate 41. Since the support substrate 41 is used as a base of the ink-receiving layer 12, the average roughness (Ra) of the surface (the label surface 11b) is preferably as small as possible, and more preferably 0.1 µm or less. The surface roughness of 0.1 µm or less can easily be achieved by injection for forming the support substrate 41, The structure and material of the functional layer 42 depend upon the type of disk used a currently proposed rewritable disk comprises a recording layer containing a phase change material, a plurality of dielectric layers holding the recording layer therebetween, and a reflective layer containing a metal (refer to FIG. 5). As a material for the support substrate 41, the same materials as the above-described preferred examples of the material for the light-transmissive substrate 21 can be used.

Any one of the disks shown in FIGS. 2(a) to 2(c) has a thickness of about 1.2 mm and a diameter of about 120 mm, but a disk to which the present invention can be applied is not limited to these disks. Namely, any type of disk may be used as long as it has the light incidence surface 11a and the label surface 11b opposite thereto. Furthermore, the outer shape is not necessarily disk-shaped, and the light incidence surface 11a and the label surface 11b may be of a rectangular shape.

The ink-receiving layer 12 constitutes one of the outermost layers of the optical recording medium 10. In this embodiment, the ink-receiving layer 12 is provided directly on the label surface 11b of the disk body 11. The ink-receiving layer 12 is colored white (hue: N, brightness: 9.5, chroma: 0) by adding a white pigment, and functions to receive and fix an ink supplied from an ink jet printer. As a material for the ink-receiving layer 12, a material containing a hydrophilic resin such as polyvinyl alcohol or polyvinyl acetal as a main component, and a cationic polymer used as an ink fixing agent is preferably used. Preferred examples of the white pigment include titanium oxide, zinc oxide, aluminum oxide, aluminum hydroxide, white lead (basic lead carbonate), strontium titanate, calcium carbonate, mica, barium sulfate, silica, talc, kaoline clay, pyrophyllite clay, and zeolite. In particular, titanium oxide is most preferably selected because it has a high refractive index and can generate a color even when used in a small amount.

The particle size of the white pigment is preferably as small as possible for decreasing the surface roughness. Specifically, the particle size is preferably 0.1 µm to 1.0 µm. When titanium oxide is used as the white pigment, the particle size is preferably 0.1 µm to 0.3 µm. The amount of the white pigment added is preferably about 2 wt % to 20 wt % on the basis of the ultraviolet curable resin. This is because when an amount of less than 2 wt % is added, a whitening effect cannot be sufficiently obtained, while when an amount of over 20 wt % is added, smoothness decreases, and ultraviolet curing is inhibited. In addition, another color pigment, organic pigment or dye may be combined for controlling the shade of white.

The smaller the average roughness (Ra) of the surface 12a of the ink-receiving layer 12, the more the print quality achieved by a printer, particularly a color and brilliance, is improved. In order to obtain a color and brilliance close to those of a silver salt photograph, i.e., photographic image quality, the average roughness (Ra) of the surface 12a of the ink-receiving layer 12 is preferably 0.1 µm or less. Although not particularly limited, the thickness of the ink-receiving layer 12 is preferably set to 10 µm to 30 µm.

The ink-receiving layer 12 is preferably formed by a spin coating process or slit coating process. As is well known, the spin coating process comprises dropwisely applying a coating solution (prepared by diluting a solution of a material of the ink-receiving layer 12 in a solvent with water or another solvent) to the center of the surface (11b) of a treatment object (the disk body 11) or the vicinity thereof, and then rotating the treatment object to spread the coating solution in the peripheral direction by centrifugal force. On the other hand, the slit coating process comprises supplying a coating solution from a slit provided in a head, and relatively moving the head and a treatment object to spread the coating solution on the surface of the treatment object.

The reason why the ink-receiving layer 12 is preferably formed by the spin coating or slit coating process is that the average roughness (Ra) of the surface 12a can be decreased by using this coating process.

As the coating solution for the spin coating or slit coating process, a solution containing the above-described hydrophilic resin and white pigment, and water as a solvent is preferably used. However, a hydrophilic organic solvent such as an alcohol may be mixed with the solvent, for improving the solubility of the resin and the drying property of the resultant film. When a hydrophilic organic solvent is mixed with the solvent, the content of the solvent is preferably set to 20 parts by weight to 100 parts by weight on the basis of 720 parts by weight of water.

The content of the hydrophilic resin is preferably set to 80 parts by weight to 90 parts by weight on the basis of 720 parts by weight of water used as the solvent. The content of the white pigment is preferably set to 5 parts by weight to 15 parts by weight on the basis of 720 parts by weight of water used as the solvent. When the contents of the hydrophilic resin and the white pigment are set in these ranges, a film having a uniform thickness and high smoothness can be formed by spin coating or slit coating.

Also, a surfactant is preferably added to the coating solution. The type of surfactant is appropriately selected according to the types of white pigment used and hydrophilic resin used The content of the surfactant is preferably set to 0.1 parts by weight to 0.5 parts by weight on the basis of 720 parts by weight of water used as the solvent.

Furthermore, colloidal silica is preferably added to the coating solution. The addition of the colloidal silica can impart a glossy feel to the surface of the ink-receiving layer 12. In this case, silica is preferably subjected to a cationic surface treatment in view of stability of the coating solution. The content of colloidal silica is preferably set to 20 parts by weight to 30 parts by weight on the basis of 720 parts by weight of water used as the solvent.

The spin coating process or slit coating process tends to increase the thickness distribution of the ink-receiving layer 12, as compared with a screen printing process. However, a desirable film can be formed by using the above-described coating solution, and thus a thickness distribution has substantially no influence on the print quality.

When the ink-receiving layer 12 is formed by the spin coating process or slit coating process, the surface quality of the underlying layer is greatly reflected, unlike in the screen printing process. Namely, the average roughness (Ra) of the underlying layer directly appears as the average roughness (Ra) of the surface 12a of the ink-receiving layer 12. In this embodiment, however, the protective layer 23 (refer to FIG. 2(a)) which can be formed by the spin coating process, or the support substrate 32 (refer to FIG. 2(b)) or the support substrate 41 (refer to FIG. 2(c)) which can be formed by injection functions as a base of the ink-receiving layer 12. Therefore, the average roughness (Ra) of the surface 11b can be easily decreased to 0.1 µm or less, and the average roughness (Ra) of the surface 12a of the ink-receiving layer 12 can also be decreased to 0.1 µm or less.

As described above, the optical recording medium 10 of this embodiment comprises the ink-receiving layer 12 colored white, and thus the ink-receiving layer 12 can be formed directly on the protective layer 23, the support substrate 32, or the support substrate 41. Therefore, even when the ink-receiving layer 12 is formed by the spin coating or slit coating process in which the surface quality of the underlying layer is greatly reflected, the average roughness (Ra) of the surface 12a of the ink-receiving layer 12 can be significantly decreased. Thus, printing by an ink jet printer can produce a color and brilliance close to those of a silver salt photograph. Also, a colored layer of white ink need not be provided below the ink-receiving layer 12, thereby simplifying the manufacturing process.

The present invention is not limited to the above-described embodiment, and various changes can be made within the scope of the claims of the present invention. Of course, these changes are included in the scope of the present invention.

Although, in each of the above embodiments, the white pigment is added to the ink-receiving layer 12 to color it white, a brightness of 8 or more and a chroma of 4 or less may be achieved by using a white material for the ink-receiving layer instead of adding the white pigment.

Also, in each of the above embodiments, the ink-receiving layer 12 is formed directly on the surface 11b of the disk body 11, but another layer may be interposed therebetween as long as the surface quality of the disk body is sufficiently reflected in the ink-receiving layer.

EXAMPLE

Ten parts by weight of a white pigment, titanium oxide A-190, produced by Sakai Chemical Co., Ltd., 85 parts by weight of a hydrophilic resin, polyvinyl alcohol, 25 parts by weight of colloidal silica, Snowtex AK, produced by Nissan Kagaku Co., Ltd., 0.2 parts by weight of a surfactant produced by NOF Corporation, and 720 parts by weight of water and 40 parts by weight of isopropyl alcohol as solvents were mixed to prepare a coating solution. In preparing the coating solution, the hydrophilic resin (polyvinyl alcohol) was first dissolved in water, and then the other materials were added to the resultant solution, followed by mixing under stirring.

On the other hand, a disk-shaped support substrate comprising polycarbonate and having a thickness of about 1.1 mm and a diameter of about 120 mm was formed by injection.

Next, the coating solution was coated on the surface of the support substrate by a slit coating apparatus. The slit coating apparatus had a slit width of 0.08 mm at the internal periphery and a slit width of 0.12 mm at the external periphery. The support substrate was rotated at 14 rpm to coat the coating solution in a radius of 20 mm to 58 mm from the center of the support substrate by slit coating. Then, the support substrate was rotated at 100 rpm for 15 seconds to level the coated film which was then dried at 80° C. for 5 minutes, to form the ink-receiving layer of about 20 µm in thickness.

The measurement of the hue, brightness, and chroma of the resultant ink-receiving layer showed a hue of N, a brightness of 9.5, and a chroma of 0. The measured surface roughness (Ra) was about 0.05 µm.

Printing on the ink-receiving layer by an ink jet printer produced a color and brilliance close to those of a silver salt photograph,

The invention claimed is:

1. An optical recording medium comprising a disk body and an ink-receiving layer disposed on the label surface of the disk body, wherein the ink-receiving layer has a brightness of 8 or more, a chroma of 4 or less, and an average surface roughness (Ra) of 0.1 µm or less.

2. The optical recording medium according to claim 1, wherein the ink-receiving layer has a brightness of 9 or more, and a chroma of 3 or less.

3. The optical recording medium according to claim 2, wherein the ink-receiving layer has a brightness of 9.2 or more, and a chroma of 0.5 or less.

4. The optical recording medium according to claim 1, wherein the disk body comprises a light-transmissive substrate, a protective layer, and a functional layer disposed between the light-transmissive substrate and the protective layer, the light-transmissive substrate having a thickness larger than that of the protective layer.

5. The optical recording medium according to claim 1, wherein the disk body comprises a light-transmissive substrate, a support substrate, and a functional layer disposed between the light-transmissive substrate and the support substrate, the light-transmissive substrate having substantially the same thickness as that of the support substrate.

6. The optical recording medium according to claim 1, wherein the disk body comprises a light-transmissive layer, a support substrate, and a functional layer disposed between the light-transmissive layer and the support substrate, the light-transmissive layer having a thickness smaller than that of the support substrate.

7. The optical recording medium according to claim 4, wherein the protective layer has an average surface roughness (Ra) of 0.1 µm or less.

8. The optical recording medium according to claim 7, wherein the ink-receiving layer is formed directly on the surface of the protective layer.

9. The optical recording medium according to claim 5, wherein the support substrate has an average surface roughness (Ra) of 0.1 µm or less.

10. The optical recording medium according to claim 9, wherein the ink-receiving layer is formed directly on the surface of the support substrate.

11. The optical recording medium according to claim 6, wherein the support substrate has an average surface roughness (Ra) of 0.1 µm or less.

12. The optical recording medium according to claim 11, wherein the ink-receiving layer is formed directly on the surface of the support substrate.

13. The optical recording medium according to claim 4, wherein the functional layer includes a recording layer.

14. The optical recording medium according to claim 5, wherein the functional layer includes a recording layer.

15. The optical recording medium according to claim 6, wherein the functional layer includes a recording layer.

16. The optical recording medium according to claim 14, wherein the recording layer contains an organic dye.

17. The optical recording medium according to claim 14, wherein the recording layer contains a phase change material.

* * * * *